June 7, 1966  G. E. MORGAN  3,254,883
PROTECTIVE ENERGY ABSORPTION CONSTRUCTION
Filed Nov. 23, 1962
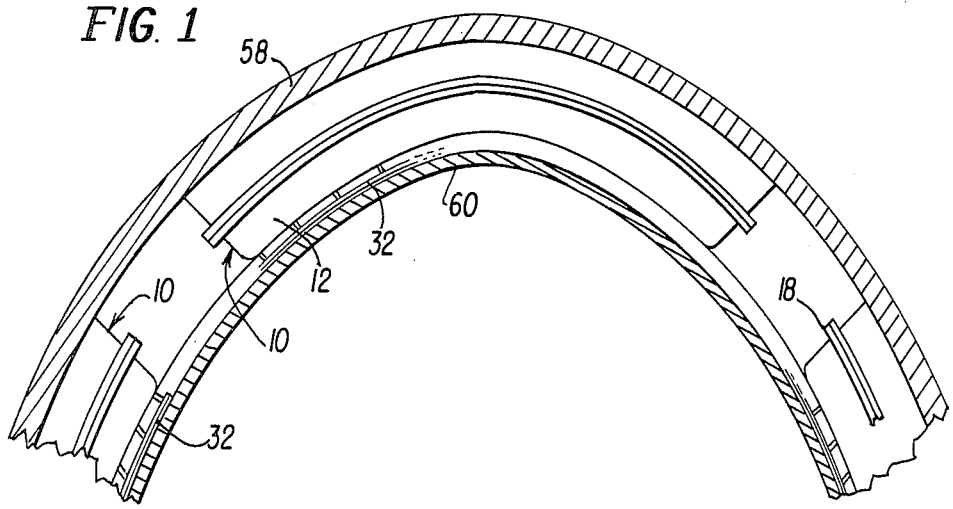
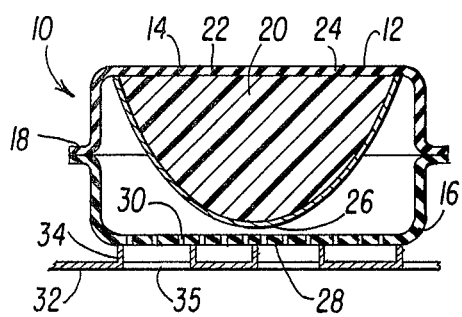
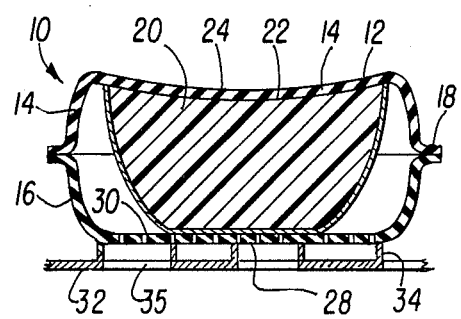
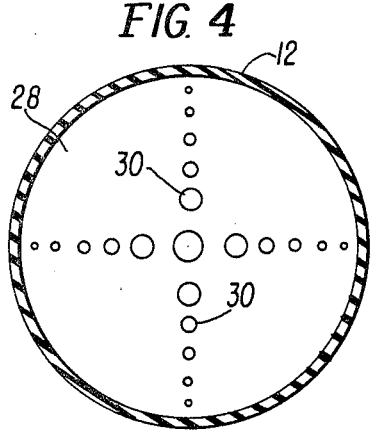
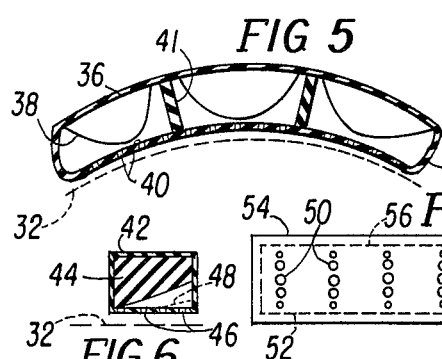
INVENTOR.
Gerard E. Morgan
BY
Ooms, McDougall & Hersh.
ATTYS.

United States Patent Office 3,254,883
Patented June 7, 1966

3,254,883
PROTECTIVE ENERGY ABSORPTION
CONSTRUCTION
Gerard E. Morgan, Glenview, Ill., assignor to John T.
Riddell, Inc., Chicago, Ill., a corporation of Illinois
Filed Nov. 23, 1962, Ser. No. 239,496
10 Claims. (Cl. 267—1)

This invention relates to a protective energy absorption construction which is designed to provide effective protection against the detrimental effects of blows, impacts, and other forces.

Energy absorbing constructions, such as protective padding, have been widely used for many diverse applications. Thus, it is common to provide automobile dashboards and other portions of vehicles with padding in order to avoid injury if an individual is thrown against these portions. Stationary objects such as gymnasium walls and floors, and goal posts are examples of other objects which are often padded since persons running into these objects could otherwise be seriously injured. Furthermore, individuals engaged in contact sports, such as football and hockey, also wear padding to offset the detrimental effects of blows received. Shoulders, hips, ribs and thighs are provided with protective coverings and the interiors of helmets are also customarily provided with energy absorbing means.

Where padding is employed, the amount of protection afforded by a given material is generally proportional to the thickness of the material. Thus, if foam rubber or similar resilient materials could be employed in extremely thick sections, virtually all injuries occasioned due to impacts could be avoided. It is obvious, however, that the use of extremely thick padding sections is impractical for most applications since the permissible padding thickness is usually limited by space considerations or by the necessity of preserving freedom of movement.

It is the general object of this invention to provide a novel energy absorbing construction which overcomes the disadvantages of prior constructions such as padding, and which is particularly effective to provide protection against blows, impacts, and other forces.

It is a further object of this invention to provide an energy absorbing construction which includes means for releasing air in a controlled fashion whereby a pneumatic action is realized thereby providing a highly effective form of protection.

It is a more particular object of this invention to provide an energy absorbing construction which includes a novel metering means for exhausting air from within the construction to thereby provide a decelerating action effective to offset the detrimental effects of blows.

These and other objects of this invention will appear hereinafter and for purposes of illustration but not of limitation, specific embodiments of this invention are shown in the accompanying drawings in which:

FIGURE 1 is a sectional elevational view illustrating the energy absorbing construction of this invention associated with a protective helmet;

FIGURE 2 is an enlarged sectional view of the interior of a typical construction characterized by the features of this invention;

FIGURE 3 is an enlarged sectional view illustrating the construction shown in FIGURE 2 as it appears when reacting to a blow;

FIGURE 4 is a plan view of a construction illustrating one possible pattern which can be taken by the ports which provide the metered exhaust of this invention;

FIGURE 5 is a sectional view of one alternative form which can be assumed by the structure of this invention;

FIGURE 6 is a sectional view illustrating an additional alternative form which can be assumed by the structure; and, FIGURE 7 is a plan view illustrating an additional pattern and structural shape contemplated in accordance with the principles of this invention.

The protective energy absorbing structure of this invention generally consists of an outer covering composed of an essentially air-impervious material. At least one face or wall of this covering is relieved by a plurality of ports, and a resilient member is disposed within the covering adjacent these ports. The resilient member includes one portion which is normally situated in closely spaced relation with respect to at least one of the ports defined by the wall of the structure. Other portions of the resilient member recede away from this first mentioned portion although all or most of the ports are disposed opposite portions of the resilient member.

When a blow is delivered to a structure of the type described, the air-impervious covering is naturally moved into engagement with the resilient member disposed within the covering. This resilient member is adapted to engage the wall of the structure which defines the ports, and to close off these ports in a sequential manner whereby the passage of air out of the structure becomes progressively more restricted. It will be appreciated that by progressively reducing the rate of escape of air out of the covering, the cushioning effect of the confined air will become progressively greater. The amount of this cushioning effect is dependent on the rate of escape of the air and this construction provides a cushioning effect which is directly proportional to the force of an impact. Thus, a heavy blow causes rapid closing off of the ports and a high initial resistance. Lighter blows reduce the rate of closure of the ports and accordingly, the initial resistance by the construction is decreased.

The accompanying drawings provide illustrations of various forms which can be assumed by structures characterized by the inventive concepts. In FIGURES 1, 2 and 3, there are illustrated structures 10 which comprise an outer covering 12 formed in two sections 14 and 16. These sections may be joined at their edges as shown at 18 to provide an enclosure which is airtight at these points.

Disposed within the covering 12, is a resilient member 20 which is secured at its base 22 to an outer wall 24 of the construction. The member 20 includes a central surface portion 26 which is disposed closely adjacent the inner wall of the construction. The remaining surface portions of the member 20 recede away from the central portion to their connections with the wall 24.

The inner wall 28 of the construction is relieved by a plurality of ports 30. A spacer means 32 is connected to this wall 28 on the outer face thereof. This spacer means comprises a grill-like configuration which is spaced from the wall 28 by means of supports 34. The openings 35 in the spacer means 32 permit free passage of air from the interior of the construction 10 to the outside atmosphere, while the supporting structure prevents blocking of the ports 30 by objects situated outside of the covering 12.

FIGURE 4 illustrates one possible configuration which can be assumed by the ports formed in the wall 28. These ports include a central port adapted to be disposed opposite the central portion 26 of the resilient member 20. A plurality of other ports extend radially away from this central port, and these other ports are disposed opposite respective surface portions of the member 20. It will be noted that the central port shown in FIGURE 4 is relatively large while the remaining ports become progressively smaller as they approach the periphery of the padding structure. The use of ports of varying diameters constitutes one means of providing for controlled exhaust of air from the interior of the construction. It will be understood, however, that ports of the same size as well as ports of a wide variety of dimensions can function to provide metered exhaust and are contemplated for use in accordance with this invention.

FIGURE 3 illustrates the manner in which a structure of this invention will react when subjected to a blow. Thus, when a blow is delivered to either side of the construction, the inner wall 28 of the construction will move into engagement with the resilient member 20. This will operate initially to close off the centrally disposed port or ports, and as the full impact of the blow is received, the remaining ports will be engaged to thereby gradually decrease the number of ports which will provide for exhaust of air. As more ports are closed off, the passage of air out of the structure 10 will become more and more restricted and the air will become more compressed. The compressed air will begin absorbing the effects of a blow at the moment of impact and, as previously explained, the magnitude of the resistance of the confined air will depend on the magnitude of the blow delivered.

Where the ports being blocked are designed to become progressively smaller, as in the example shown in FIGURE 4, the pneumatic resistance increases rapidly. As heavier blows are delivered, the resistance builds up more rapidly and therefore this structure also automatically accommodates itself in accordance with the intensity of a blow. In this connection, it should be noted that although air may escape from the covering through the outer ports even in the later stages of the blow, the pressure of the air within the structure is still increased since the outer ports cannot release it fast enough. A slow release of air through these outer ports cooperates to provide ideal deceleration in the later stages of an impact situation.

The configuration illustrated in FIGURE 4 has been found to provide a particularly effective pattern for providing, in a controlled manner, deceleration of an object engaging the construction. This configuration, wherein a relatively large central port is surrounded by rows of progressively smaller ports, operates to permit rapid exhaust of air from within the construction in the initial stages of force application. Accordingly, the construction will compress a relatively large amount during these initial stages, however, as the exhaust of air is restricted, the resistance to compression of the construction will increase due to the increased resistance occasioned by the build up of air pressure. By providing an increase in resistance at a time subsequent to the initial stages of force application, the effects of a blow are absorbed more gradually thereby providing a reduced tendency toward injury. This feature of the instant invention materially improves over the use of resilient material alone since a desirable absorption of energy resulting from the application of a blow cannot be advantageously effected with such material unless it is utilized in extremely thick sections. The structure of this invention can therefore be utilized with similar effectiveness in relatively thin sections when compared to thicker constructions comprising substantially all resilient padding.

FIGURES 5, 6 and 7 illustrate constructions which embody the basic concepts of this invention but which provide illustrations of some of the conceivable variations of the invention. In FIGURE 5, a single air-impervious covering 36 provides an enclosure for a plurality of resilient members 38. Ports 40 are defined in the covering 36 and air impervious partitions 41 close off a space for each of the resilient members 38 whereby a group of ports is operatively associated with each member 38. The ports are adapted to be progressively blocked by their associated resilient members upon application of a blow to any area of the structure. In a configuration of this nature, each segment comprising a resilient member and associated ports can act independently, or the several segments can act simultaneously, depending on the magnitude and area of distribution of the force applied.

FIGURE 6 illustrates a further variation wherein an air-impervious covering 42 provides an enclosure for retaining resilient member 44. Air is adapted to be exhausted from the enclosure through ports 46 defined in the covering 42. It will be noted that the resilient member 44 extends upwardly from one side of the enclosure to the other. With this arrangement, the ports are progressively blocked laterally across the enclosure as suggested by the dotted line 48.

The construction shown in FIGURE 7 illustrates an alternative proposal for the provision of ports 50 within the one wall 52 of the covering 54. These ports comprise a plurality of rows extending laterally across the construction and a resilient member 56 is disposed within the construction for progressively closing off these ports when a blow is applied. The elongated resilient member 56 can take the form of a semicylinder and therefore may comprise a central portion disposed opposite the larger ports with receding surface portions on either side of this central portion to provide for blocking of the smaller ports.

FIGURE 1 illustrates the application of structures 10 to the inside of a helmet shell 58. As shown in this drawing, the structures can be shaped to fit the contour of the helmet shell, and it will be obvious that the structures can be adapted to assume the shape of a wide variety of surfaces. In the illustrated embodiment, a pad 60 is disposed over the spacers 32 for the structures 10, and this pad can vary in thickness to accommodate different head sizes. Where the structures of this invention are attached to a member such as the shell 58, such a member can comprise part of the covering for the construction. In other words, a resilient member 20 could be directly secured to the inner surface of the helmet shell and the covering 12 secured around its edges to the shell. The covering 12 may comprise a single piece of material in an application of this nature or in other alternative constructions.

It will be appreciated that any essentially air-impervious material, such as rubber, leather or various other natural and synthetic compositions, can be employed for use as the outer covering of the constructions. Similarly, various natural and synthetic sponge and foam materials are suitable for use in forming the interior resilient members. A moisture-proof layer, for example a vinyl dip coating, can be provided for any of the described components. The spacers 32 may be formed of a relatively rigid plastic or a similar material which is adapted to be formed into a grill-like configuration to permit free passage of air out of the enclosure defined by the structure. The spacers must also be adapted to be shaped into various contours and to yield without fracture when a blow is applied to the construction.

As previously noted, the instant invention contemplates pads having a wide variety of configurations. Accordingly, the number of ports in a given pad will vary in accordance with the surface area, and the size of these ports will also vary in accordance with the surface area and the size of these ports will also vary in accordance with the surface area and the pneumatic resistance found desirable for a particular application. In a typical example, large ports will have a diameter of about ⅛ of an inch and the diameters will decrease to about ¹⁄₆₄ of an inch where varying sizes are to be employed.

It will be understood that various modifications may be made in the structures of this invention which provide the characteristics of this invention without departing from the spirit thereof particularly as defined in the following claims.

That which is claimed is:

1. An energy absorbing structure comprising an outer covering of an essentially air-impervious material, a plurality of ports defined by said covering on at least one face thereof, an interior member formed of a resilient material, the surface of said interior member having one portion disposed adjacent to said one face with other surface portions receding away from said one face, said one surface portion being adapted to close off at least one of said ports upon delivery of a blow to said structure and said other surface portions being adapted to sequentially close off others of said ports.

2. A structure in accordance with claim 1 including spacer means disposed over said one face for preventing closure of said ports by objects engaging the outside of said structure.

3. A structure in accordance with claim 1 wherein said one surface portion of said interior member is a centrally disposed portion and wherein said receding portions extend on either side of said centrally disposed portion.

4. An energy absorbing structure comprising an outer covering of an essentially air-impervious material, a resilient member disposed within said covering and secured on one wall thereof, the wall of said covering opposite said one wall defining a plurality of ports, the surface of said resilient member having one portion normally disposed in closely spaced-apart relation with respect to said last mentioned wall with other portions of said surface receding away from said last mentioned wall, said one surface portion being adapted to initially close off at least one of said ports upon delivery of a blow to said structure and said other surface portions being adapted to sequentially close off others of said ports.

5. A structure in accordance with claim 4 wherein said one portion of said interior member is a centrally disposed portion and said receding portion extends on either side of said centrally disposed portion, and wherein said ports comprise at least one relatively large port adjacent said centrally disposed portion and a plurality of progressively smaller ports disposed outwardly with respect to said large port.

6. A structure in accordance with claim 4 including spacer means disposed over said last mentioned wall for preventing closure of said ports by objects engaging the outside of said structure.

7. A structure in accordance with claim 4 wherein said covering comprises a flexible material which completely encloses the interior of said structure and wherein said one wall of the covering is secured on a rigid surface.

8. A structure in accordance with claim 4 wherein a rigid surface forms said one wall of the covering and the remainder of the covering comprises a flexible material fastened at its edges in air-tight relationship onto said one wall.

9. A structure comprising an outer covering of an essentially air-impervious material, a resilient member disposed within said covering and having a base portion secured on one wall thereof, the wall of said covering opposite said one wall defining a plurality of ports, said ports including a relatively large diameter port disposed centrally of said last mentioned wall with the remaining ports extending radially outwardly from said central port, the diameter of said remaining ports decreasing progressively toward the periphery of said structure, the surface of said resilient member having a central portion normally disposed in closely spaced-apart relation with respect to said large diameter port, the remaining portions of said surfaces receding away from said central portion, said central surface portion being adapted to initially close off at least said large diameter port upon delivery of a blow to said structure and said other surface portions being adapted to sequentially close off said remaining ports.

10. A structure in accordance with claim 9 including spacer means disposed over said last mentioned wall for preventing closure of said ports by objects engaging the outside of said structure.

References Cited by the Examiner

UNITED STATES PATENTS

| 1,005,201 | 10/1911 | Gurney | 188—88 |
| 1,821,787 | 9/1931 | Black | 267—1 |
| 2,556,925 | 6/1951 | Keller | 267—35 |
| 2,894,565 | 7/1959 | Conner | 267—1 X |

FOREIGN PATENTS 701,904   1/1931   France.

WALTER B. WILBER, *Assistant Examiner.*

ARTHUR L. LA POINT, *Primary Examiner.*